United States Patent
Kayyoor et al.

(10) Patent No.: US 10,311,231 B1
(45) Date of Patent: Jun. 4, 2019

(54) PREVENTING A MALICIOUS COMPUTER APPLICATION FROM EXECUTING IN A COMPUTING ENVIRONMENT

(71) Applicant: SYMANTEC CORPORATION, Mountain View, CA (US)

(72) Inventors: Ashwin Kumar Kayyoor, Sunnyvale, CA (US); Petros Efstathopoulos, Los Angeles, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 135 days.

(21) Appl. No.: 15/716,903

(22) Filed: Sep. 27, 2017

(51) Int. Cl.
G06F 21/55 (2013.01)
G06F 21/56 (2013.01)
G06K 9/62 (2006.01)
G06F 11/07 (2006.01)
G06F 16/901 (2019.01)

(52) U.S. Cl.
CPC ........ G06F 21/552 (2013.01); G06F 11/0706 (2013.01); G06F 11/079 (2013.01); G06F 11/0751 (2013.01); G06F 16/9024 (2019.01); G06F 21/56 (2013.01); G06K 9/6224 (2013.01)

(58) Field of Classification Search
None
See application file for complete search history.

(56) References Cited

U.S. PATENT DOCUMENTS

2010/0145771 A1* 6/2010 Fligler ................... G06Q 10/10
705/319
2015/0186653 A1* 7/2015 Gkoulalas-Divanis ......................
G06F 21/60
726/26

OTHER PUBLICATIONS

Mittal et al., "Preserving Link Privacy in Social Network Based Systems", NDSS (Year: 2012).*
Bollobas, Bela, "Modern Graph Theory", Graduate Texts in Mathematics, 1998, 1 page.
Bunke, Horst et al., "A Graph-Theoretic Approach to Enterprise Network Dynamics", Progress in Computer Science and Applied Logic, 2000, 230 pages.
Papadimitriou, Panagiotis et al., Web Graph Similarity for Anomaly Detection, Journal of Internet Services and Applications, 2008, 1 page.
Peabody, Mitchell, Finding Groups of Graphs in Databases, Master's Thesis, Drexel University, 2003, 98 pages.
(Continued)

Primary Examiner — Henry Tsang
(74) Attorney, Agent, or Firm — Maschoff Brennan

(57) ABSTRACT

Preventing a malicious computer application from executing in a computing environment. In one embodiment, a method may include identifying a base graph, identifying a perturbed graph, determining an importance of each of the edges in the base graph using an Edge Current-Flow Based Betweenness Centrality (ECFBBC) metric, identifying the edges in the base graph that match the edges in the perturbed graph, determining a utility value for the perturbed graph, determining whether the utility value is above a threshold utility value, in response to determining that the utility value is above the threshold utility value, employing the perturbed graph to analyze a computer application and determine that the computer application is malicious, and performing a security action on the malicious computer application to prevent the malicious computer application from executing in a computing environment.

20 Claims, 5 Drawing Sheets

(56) References Cited

OTHER PUBLICATIONS

Sricharan, Kumar et al., Localizing Anomalous Changes in Time-evolving Graphs, SIGMOD, 2014, 12 pages.
Brandes, U., and Fleischer, D., Centrality measures based on current flow, In Proceedings of the 22nd Annual Conference on Theoretical Aspects of Computer Science (Berlin, Heidelberg, 2005), STACS'05, Springer-Verlag, pp. 533-544.
Mittal, Prateek et al., Preserving Link Privacy in Social Network Based Systems; https://www.princeton.edu/~pmittal/publications/link-privacy-ndss13.pdf, 19 pages.

* cited by examiner

PREVENTING A MALICIOUS COMPUTER APPLICATION FROM EXECUTING IN A COMPUTING ENVIRONMENT

BACKGROUND

A network security application may monitor network devices on a network to attempt to detect whether any network device has been infected with a malicious application, such as a virus or a malware. Once a malicious application is detected, the network security application may prevent the network application from executing on the network device.

One method for detecting malicious applications employs the use of a relatively large security dataset organized into a base graph having vertices (also called nodes) connected by edges. Because of the relatively large security dataset, the corresponding base graph may also be relatively large. Therefore, to reduce the overall size of a base graph, in order to improve computational efficiency, the base graph may be perturbed. Perturbing a base graph may be accomplished by adding or deleting edges, collapsing vertices into supervertices, or collapsing edges into superedges.

While a perturbed graph can be helpful in improving computational efficiency, a perturbed graph may have less utility than the base graph. Further, it may be difficult to determine just how much utility has been lost between a base graph and a perturbed graph. When the loss in utility between a base graph and a perturbed graph is unknown, using the perturbed graph in a network security application may be problematic because it may not be considered reliable enough to trust with the important task of detecting and preventing malicious applications.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for preventing a malicious computer application from executing in a computing environment may be performed, at least in part, by a computing device including at least one processor. The method may include identifying a base graph comprising edges and vertices, with the base graph related to malicious computer applications. The method may also include identifying a perturbed graph having edges and vertices, with the perturbed graph representing a summarized version of the base graph. The method may further include determining an importance of each of the edges in the base graph with respect to the base graph using an Edge Current-Flow Based Betweenness Centrality (ECFBBC) metric to generate an ECFBBC value for the edge. The method may also include identifying the edges in the base graph that match the edges in the perturbed graph. The method may further include determining a utility value for the perturbed graph by summing the ECFBBC values of the edges in the base graph that match the edges in the perturbed graph. The method may also include determining whether the utility value is above a threshold utility value. The method may further include, in response to determining that the utility value is above the threshold utility value, employing the perturbed graph to analyze a computer application and determine that the computer application is malicious. The method may also include performing a security action on the malicious computer application to prevent the malicious computer application from executing in a computing environment.

In some embodiments, the method may further include determining a penalized utility value for the perturbed graph by decreasing the initial utility value for each spurious edge in the perturbed graph by a penalty value of the spurious edge. In these embodiments, the penalized utility value may then be employed in determining whether the penalized utility value is above the threshold utility value. In these embodiments, the penalty value of each spurious edge may be proportional to a weight of the spurious edge.

In some embodiments, the perturbed graph may only have edges that match edges in the base graph. In some embodiments, the perturbed graph may have edges that do not match edges in the base graph. In some embodiments, the ECFBBC metric may treat the base graph as a resistor network in which the edges are treated as resistors and the vertices are treated as junctions between the resistors such that the ECFBBC value of an edge is an amount of current that flows through the edge, averaged over all source-destination vertex pairs, when one unit of current is induced at the source, and the destination is connected to ground. In some embodiments, the malicious computer application may be a virus or malware. In some embodiments, the performing of the security action may include removing the malicious computer application from the computing environment or quarantining the malicious computer application in the computing environment.

Also, in some embodiments, one or more non-transitory computer-readable media may include one or more computer-readable instructions that, when executed by one or more processors, cause the one or more processors to perform a method for preventing a malicious computer application from executing in a computing environment.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

A network security application may employ a perturbed graph instead of a base graph to detect malicious applications. For example, a base graph may relate to malicious applications, but the linked nature of the base graph may cause the base graph to contain and encode inter-linked sensitive information. To achieve certain privacy and anonymization guarantees and/or to reduce the overall size of the graph to improve computational efficiency, the base graph may be summarized as a perturbed graph, and a security application may employ the perturbed graph in place of the base graph. One difficulty with using a perturbed graph, however, is the inherent loss in utility between the base graph and the perturbed graph.

Some embodiments disclosed herein may prevent a malicious computer application from executing in a computing environment. For example, some embodiments may use an Edge Current-Flow Based Betweenness Centrality (ECF-BBC) metric to determine a utility value for a perturbed graph and then only employing the perturbed graph to detect malicious applications where the utility value is higher than a threshold utility value. In this manner, the utility value of a perturbed graph with respect to its base graph may be accurately determined, and then the perturbed graph may be employed in malicious application detection and remediation only where the perturbed graph has a sufficiently high utility value.

Figure 1:
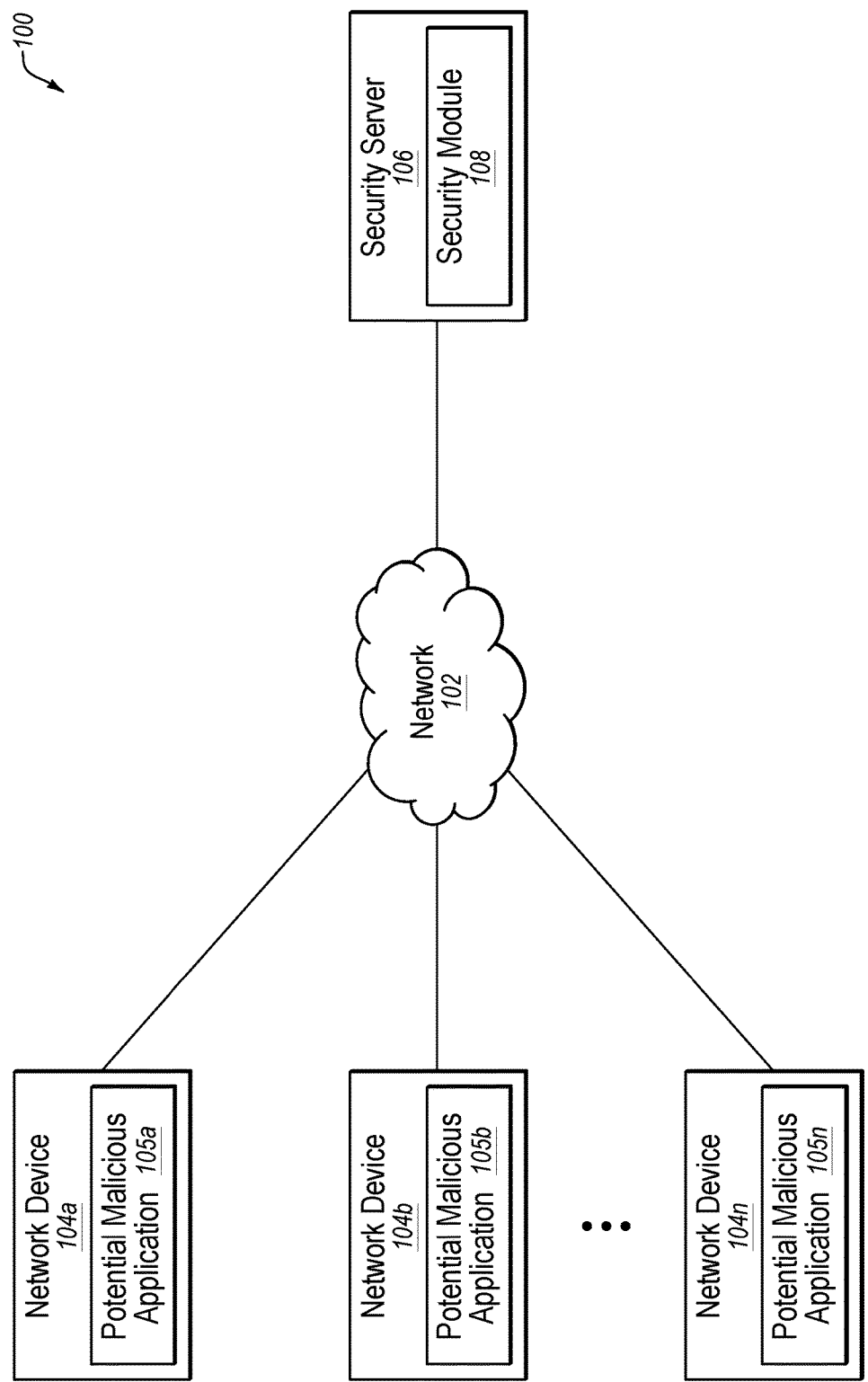
FIG. 1 illustrates an example system configured for preventing a malicious computer application from executing in a computing environment.

Turning to the figures, FIG. 1 illustrates an example system 100 configured for preventing a malicious computer application from executing in a computing environment. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
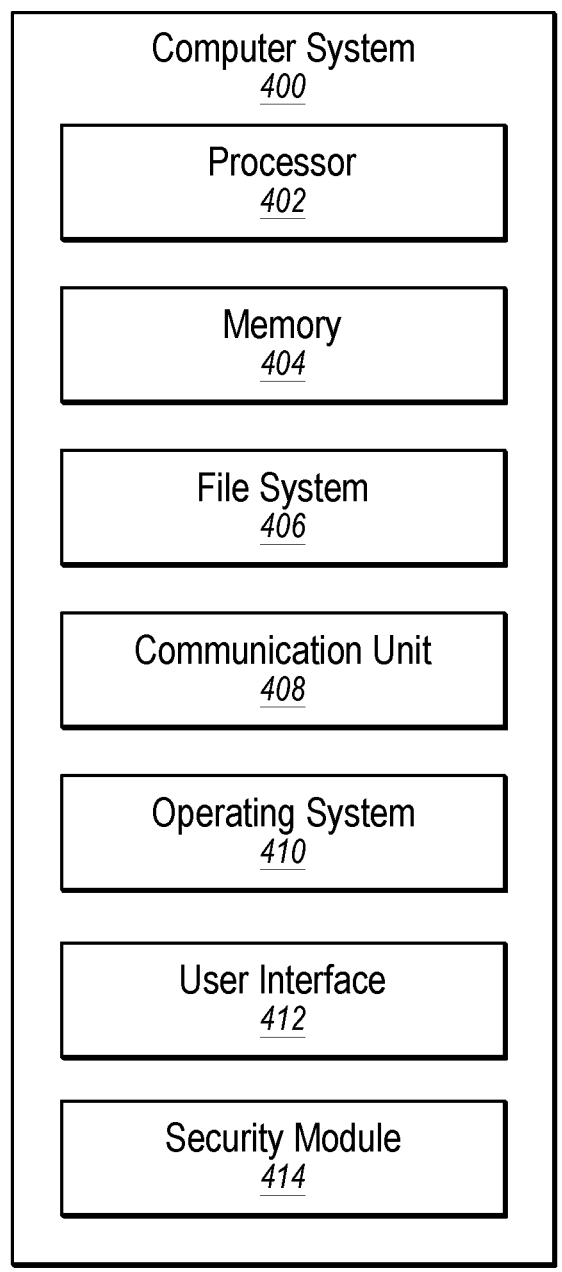
FIG. 4 illustrates an example computer system that may be employed in preventing a malicious computer application from executing in a computing environment.

In some embodiments, each of the network devices 104a-104n may be any computer system capable of communicating over the network 102, examples of which are disclosed herein in connection with the computer system 400 of FIG. 4. The network devices 104a-104n may include potentially malicious applications 105a-105n, respectively. In some embodiments, a malicious application may include one or more of a spyware, a virus, a worm, a logic bomb, a trapdoor, a Trojan horse, a Remote Admin Trojan (RAT), a malware, a mobile malicious code, a malicious font, and a rootkit. When any of the potentially malicious applications 105a-105n is determined to be an actual malicious application, the corresponding one of the network devices 104a-104n may be determined to be infected, and the malicious application may be prevented from executing in a computing environment of the corresponding network devices, such as in an operating system of the network device. In contrast, when any of the potentially malicious applications 105a-105n is determined to not actually be a malicious application, the corresponding one of the network devices 104a-104n may be determined to be clean.

In some embodiments, the security server 106 may be any computer system capable of communicating over the network 102 and capable of monitoring the network devices 104a-104n for infections with malicious applications (in real-time and/or after-the-fact), examples of which are disclosed herein in connection with the computer system 400 of FIG. 4. In some embodiments, the security server 106 may be employed by an organization that manages the network 102 and the network devices 104a-104n. In some embodiments, the security server 106 may include a security module 108 that may be configured to prevent malicious applications from executing in a computing environment, such as in the operating systems executing on the network devices 104a-104n, as disclosed in greater detail in connection with FIGS. 2 and 3A-3B herein. In some embodiments, the security module 108 may include, or have access to, security data organized into a base graph and/or a perturbed graph. In some embodiments, the security module 108 may include, or be part of, a network security application, such as Symantec's Norton software.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
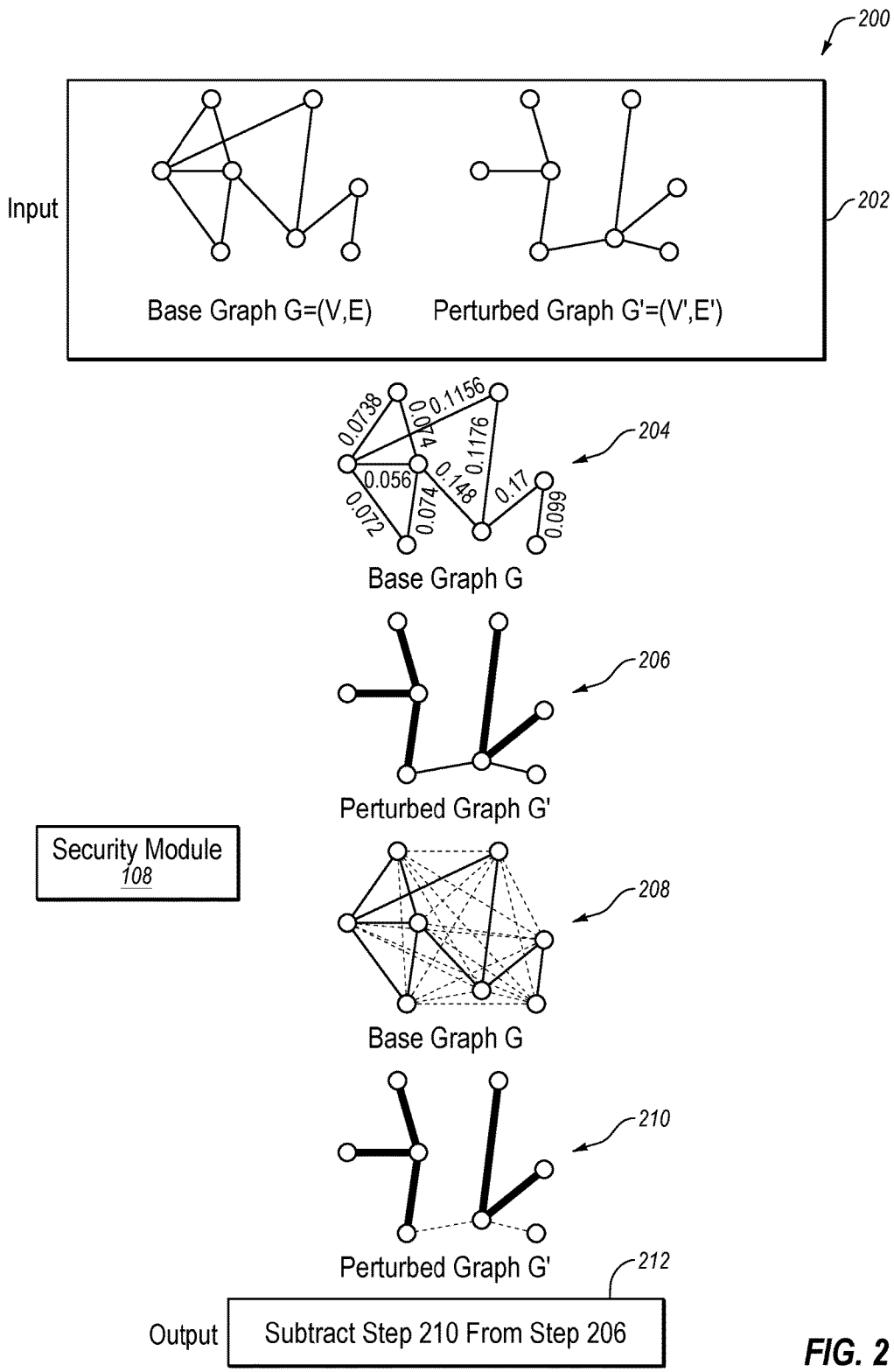
FIG. 2 is a flowchart of an example method for determining a utility of a perturbed graph.

FIG. 2 is a flowchart of an example method 200 for determining a utility of a perturbed graph G'. The method 200 may be performed, in some embodiments, by a device or system, such as by the security module 108 executing on the security server 106 of FIG. 1, which is also illustrated in FIG. 2. In these and other embodiments, the method 200 may be performed by one or more processors based on one or more computer-readable instructions stored on one or more non-transitory computer-readable media. The method 200 will now be described in connection with FIG. 2.

The method 200 may include, at step 202, the security module 108 identifying a base graph G=(V,E) and a perturbed graph G'=(V',E'), where V represents the eight vertices and E represents the ten edges of the base graph G, and V' represents the eight vertices and E' represents the seven edges of the perturbed graph G'. In the embodiments disclosed in step 202, both the base graph G and the perturbed graph G' include the same eight vertices (i.e., the vertices V match the vertices V'), but the edges E' of the perturbed graph G' has five fewer edges and two additional edges (known as spurious edges) as compared to the edges E of the base graph G (i.e., some of the edges E' do not match the edges E).

The method 200 may include, at step 204, the security module 108 determining the importance of each of the edges E in the base graph G using an Edge Current-Flow Based Betweenness Centrality (ECFBBC) metric. In the embodiment disclosed in step 204, the security module 108 may use an ECFBBC metric to generate a relative utility of each of the edges E with respect to the entire base graph G, which is known as the ECFBBC value of each of the edges E. Each of the ECFBBC values may be normalized between 0 and 1 such that the sum of the ECFBBC values equals 1. For example, the sum of the ECFBBC values of the edges E illustrated in step 204 are normalized such that the sum of these ECFBBC values equals 1 (i.e., 0.0738+0.074+0.056+0.072+0.074+0.1156+0.148+0.1176+0.17+0.099=1).

The method 200 may include, at step 206, the security module 108 identifying the edges E in the base graph G that match the edges E' in the perturbed graph G' and determining an initial utility value for the perturbed graph G' based on these matching edges. In the embodiment disclosed in step 204, the security module 108 may identify the five common edges between the edges E in the base graph G that match the edges E' in the perturbed graph G' (which are bolded in step 206). The security module 108 may then determine an initial utility value for the perturbed graph G' by summing the ECFBBC values of these common edges (i.e., 0.074+0.056+0.074+0.1176+0.17=0.4916 or 49.16%).

The method 200 may include, at steps 208 and 210, the security module 108 identifying spurious edges in the perturbed graph G'. In general, where a perturbed graph only has edges that match edges in a base graph, the perturbed graph does not have any spurious edges. However, where a perturbed graph has edges that do not match edges in the base graph, these non-matching edges are known as spurious edges of the perturbed graph. In the embodiment disclosed in step 208, all potential spurious edges are disclosed (as dashed lines) in the base graph G. The total number of potential spurious edges in the base graph G may be determined by (|V| c 2)-|E|, where |V| and |E| are the total number of vertices V and edges E, respectively, in the base graph G (i.e., 28-10=18 potential spurious edges). In the embodiment disclosed in step 210, the two spurious edges in the perturbed graph G' (determined by E'-E) are disclosed (as dashed lines).

The method 200 may include, at step 212, the security module 108 determining a penalized utility value for the perturbed graph G' by decreasing the initial utility value for each spurious edge in the perturbed graph G', by a penalty value of the spurious edge. For example, the penalty value of each spurious edge may be proportional to a weight of the spurious edge. In some embodiments, each spurious edge in the perturbed graph G' may be weighted proportionally with respect to the total number of potential spurious edges. In the embodiment disclosed in step 212, the security module 108 may assign a penalty value to each spurious edge of 1/18, since there are 18 potential spurious edges. Therefore, the security module 108 may determine a penalized utility value for the perturbed graph G' by decreasing the initial utility value (i.e., 0.4916) for each spurious edge in the perturbed graph G' by the penalty value (i.e. 1/18 or 0.0556) of the spurious edge (i.e. 0.4916-(0.0556+0.0556)=0.3805 or 38.05%). In other words, the security module 108 may determine at step 212 that the penalized utility value of the perturbed graph G' is 0.3805 or 38.05% of the value of the base graph G. The security module 108 may then compare this penalized utility value to a threshold utility value to determine whether the utility value of the perturbed graph G' is sufficiently high to employ the perturbed graph G' in a network security application for a task such as detection and remediation of malicious applications.

In some embodiments, the penalized utility value of the perturbed graph G' may be defined as the similarity between the perturbed graph G' and the base graph G, denoted by $U(G')_G=sim(G,G')$. In some embodiments, the method 200 may be an improvement to conventional methods because it is aware of the importance of an edge to the overall structure of a graph, as well as also considering the importance of vertices to the graph. In order to become aware of edge importance, the method 200 may measure the degree of participation of edges in communication between different vertices in the graph. Further, the method 200 may employ the notion of betweenness centrality. In particular, the method 200 may consider the abundance and the length of all paths in a graph, since knowledge about importance of each edge to the overall graph structure is enhanced as more routes are possible. Therefore, in order to take such paths into account, the method 200 considers the edge current-flow betweenness centrality (eCF-betweenness) of a graph using an Edge Current-Flow Based Betweenness Centrality (ECFBBC) metric. In so doing, the method 200 may consider the graph as a resistor network in which the edges are resistors and the vertices are junctions between resistors. In this context, two vertices are relatively close if the difference of potential between them (or effective resistance) is low when a unit of current is injected at one vertex and removed at the other vertex. More particularly, the eCF-betweenness of an edge may be considered to be the amount of current that flows through it, averaged over all source-destination pairs, when one unit of current is induced at the source, and the destination (sink) is connected to the ground.

More formally, consider two fixed vertices s and t on which we apply a voltage difference sufficient to drive one unit of current (1A) from s to t. Let the (s,t)-flow of edge e{u, v}, denoted by $f_{st}(u, v)$, be the flow that passes through edge e in this configuration. Then eCF-betweenness centrality can be given by:

$$eCF_e = \frac{2}{(n-1)(n-2)} \sum_{(s,t)} f_{st}(u, v)$$

Further, the ECFBBC metric may be employed to determine utility of a perturbed graph G' given its base graph G. This may include determining edge importance scores using eCF-betweenness over G. Once edge importance scores eCF are calculated, they may be normalized so that $\Sigma_e \, eCF_e = 1$. Then, to determine overall utility, the method 200 may need to handle two cases: Case 1 and Case 2.

In Case 1, the size of the perturbed graph G' is smaller than the base graph G. In this case, for the edges {E'∩E} that exists both in base graph G and perturbed graph G' (e.g., common edges), the method 200 only determines an initial utility value by adding up edge importance scores for these common edges.

In case 2, the perturbed graph G' includes spurious edges. Because spurious edges increase the noise in the perturbed graph G', the method 200 penalizes the initial utility value proportional to the number of spurious edges introduced in the perturbed graph G' when compared to a maximum number of spurious edges that can be introduced in the base graph G. Given the base graph G=(V,E), the maximum number of spurious edges that can be introduced in the perturbed graph G' is (|V| c 2)-|E|, where |V| and |E| are the total number of vertices V and edges E, respectively. Therefore, given {E'-E} spurious edges introduced in perturbed graph G', and assuming all spurious edges have equal weights on them, a penalized utility value (otherwise known as an overall utility $U(G')_G$) can be given by:

$$\frac{\{E'-E\}}{(|V|c2)-|E|}$$

For the sake of generality, in the case where spurious edges have unequal weights, for each spurious edge e∈{E'-E}, utility can be penalized by:

$$\frac{wt_e}{\left(\sum_{e \in \{E'-E\}} wt_e\right) + ((|V|c2)-|E|)}$$

where $wt_e$ is the weight of a spurious edge e. In some embodiments, the higher the weight of a spurious edge, the proportionally bigger the penalty.

Pseudocode for Edge Current-Flow Based Simple Graph Utility (eSGU) may be given as follows:

```
 1:    procedure eSGU(G = (V, E), G' = (V' , E'))
 2:        utility = 0.0
 3:        eCF = eCF-betweenness(G)
 4:        eCF = normalize(eCF)
 5:        if G ≠ 0 and G' ≠ 0 then
 6:            for e ∈ E do
 7:                if e ∈ E' then
 8:                    utility = utility + eCF_e
 9:                end if
10:            end for
11:        end if
12:        if |E' − E| > 0 then
13:            for e ∈ {E' − E} do
14:
```

$$\text{utility} = \text{utility} - \frac{\text{wt}_e}{\left(\sum_{e \in [E'-E]} \text{wt}_e\right) + ((|V|c2) - |E|)}$$

```
15:            end for
16:        end if
17:        return utility
18:    end procedure
```

In some embodiments, the method 200 may have the following four properties. First, Edge Importance, where changes that create disconnected components or weaken the overall connectivity are penalized more than changes that maintain the connectivity properties of the graph. Second, Spurious Edge Awareness, where the greater the number of spurious edges introduced, the less the utility value of the perturbed graph. Third, Weight Awareness, where in weighted graphs, the greater the weight of the removed edge or the added spurious edge, the greater the impact on the utility value. Fourth, Edge Submodularity, where a specific change is more important in a graph with fewer edges than in a much denser but equally-sized graph.

Modifications, additions, or omissions may be made to the example method 200 of FIG. 2 without departing from the scope of the present disclosure. For example, although the method 200 is disclosed herein for use in determining a utility of a perturbed graph G' in connection with malicious application detection and remediation, it is understood that the method 200 may be employed in any of a number of other applications or environments. In particular, the method 200 may be employed in any application or environment involving a relatively large base graph. Some example applications or environments include, but are not limited to, graph visualization, security data analysis, confidential data sharing and data markets, and graph analysis.

With respect to graph visualization, when relatively large and complex base graphs are visualized on a display, the base graph may look like a hairball and it may be difficult for a user to discern individual vertices, edges, and related patterns. To simplify base graphs for visualization on a display, base graphs may be perturbed, such as by removing edges, removing vertices, collapsing edges into superedges, and/or collapsing vertices into supervertices, thereby simplifying the base graph. The simplification of a base graph into a perturbed graph may allow a user to better visualize the base graph on a display, which may allow the user to more easily analyze the base graph. Although a perturbed graph may help a user to visualize a base graph, the perturbed graph may not necessarily maintain enough utility to be sufficiently meaningful for a user. Therefore, the method 200 may be employed to determine a utility of a perturbed graph in order to guarantee that the perturbed graph has not dropped below a threshold utility value in order to ensure that the perturbed graph is sufficiently meaningful for a user. For example, the base graph may be iteratively perturbed, and each perturbed graph may be assigned a utility value using the method 200, until the assigned utility value of a perturbed graph drops below a threshold utility value. Then only perturbed graphs with utility values above the threshold utility value may be employed in visualizations of the base graph.

With respect to security data analysis, network security applications may perturb large security-related base graphs to achieve perturbed graphs representing simplified graph datasets to achieve certain privacy and anonymization guarantees and/or to reduce the overall size of the graph to improve computational efficiency. The method 200 may be employed in this process in order to guarantee that each perturbed graph has not dropped below a threshold utility value to ensure that the perturbed graph is sufficiently high in utility to remain useful to a network security application.

With respect to confidential data sharing and data markets, a security organization may desire to share or sell confidential datasets, organized as base graphs, to different parties with varying levels of trust. When sharing or selling these base graphs, the security organization may want to hide certain confidential information by perturbing the base graphs. However, as noted above, perturbing a base graph generally decreases the overall utility of the base graph. Therefore, the method 200 may be employed, when sharing or selling confidential datasets organized as base graphs, to create perturbed graphs that sufficiently hide confidential information while maintaining sufficient utility value to be useful to the parties with whom the perturbed graphs are shared or to whom the perturbed graphs are sold.

With respect to graph analysis, the method 200 may be employed for various types of graph analysis. For example, relatively large base graphs related to various network security applications may be converted into perturbed graphs and then analyzed to determine a utility value using the method 200 prior to the perturbed graphs being employed by a network security application. For example, base graphs may relate to the following security areas:

1. inter-object relationships for forensics, assets, policies and applications;
2. customer and partner insight data;
3. behavioral segmentation;
4. clustering coefficient betweenness or closeness;
5. product strength and weakness;
6. finding probability of a file being malicious and its impact to an enterprise;
7. recommendations (loopy belief propagation)—probability and beliefs;
8. calculating file, machine, user risk scores;
9. malware behavior detection;
10. cloud application security (such as Symantec's CloudSOC platform);
11. auditing of shadow IT;
12. real-time detection of intrusions and threats;
13. protection against intrusions and compliance violations;
14. investigation of historical account activity for post-incident analysis; and
15. tracking the nuanced usage patterns of every employee.

While most of these techniques may be difficult to scale on a relatively large graph, these techniques may be tractable on a simplified perturbed graph, which can be evaluated using the method 200.

Figure 3A:
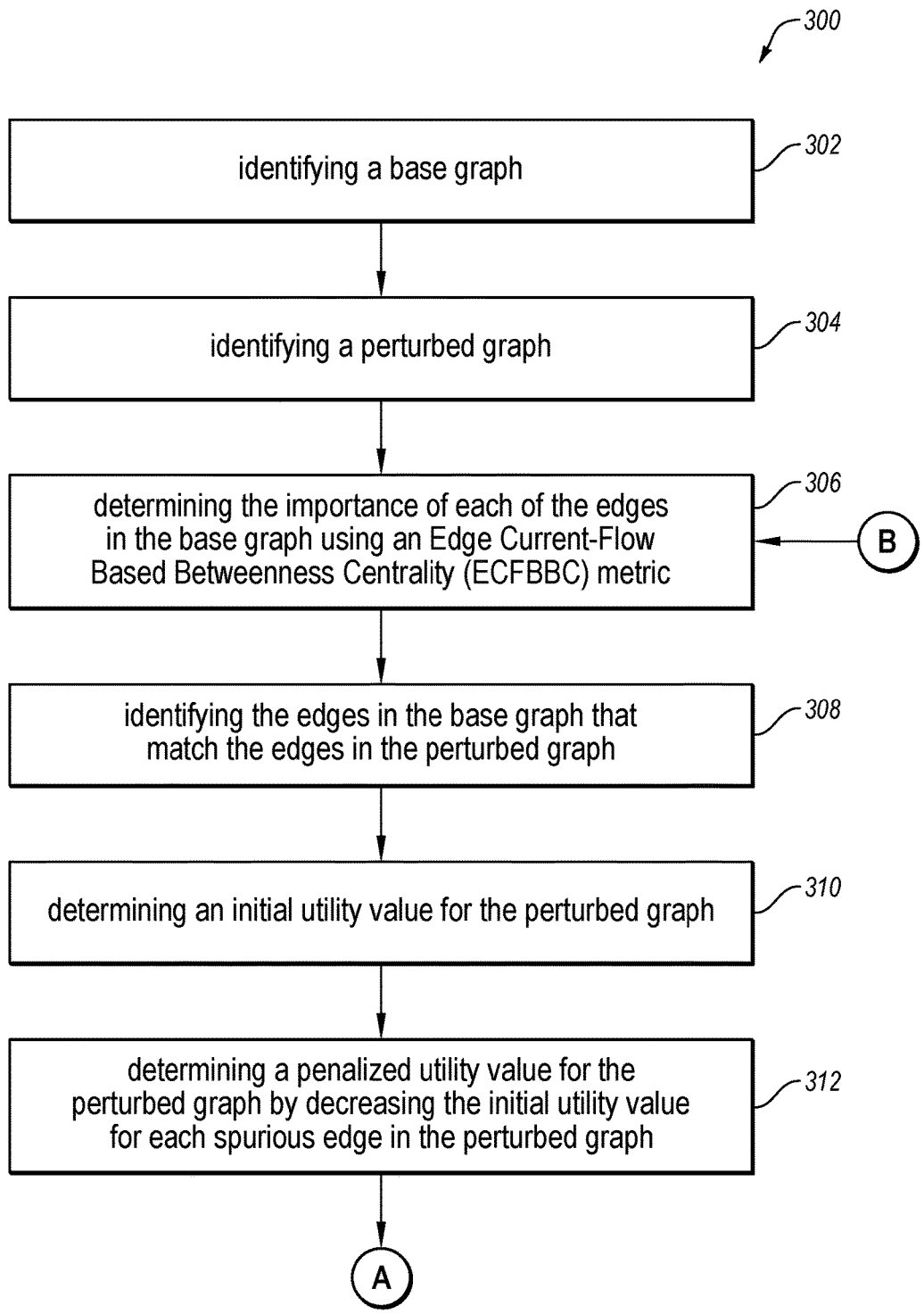
FIGS. 3A-3B are a flowchart of an example method for preventing a malicious computer application from executing in a computing environment.
Figure 3B:
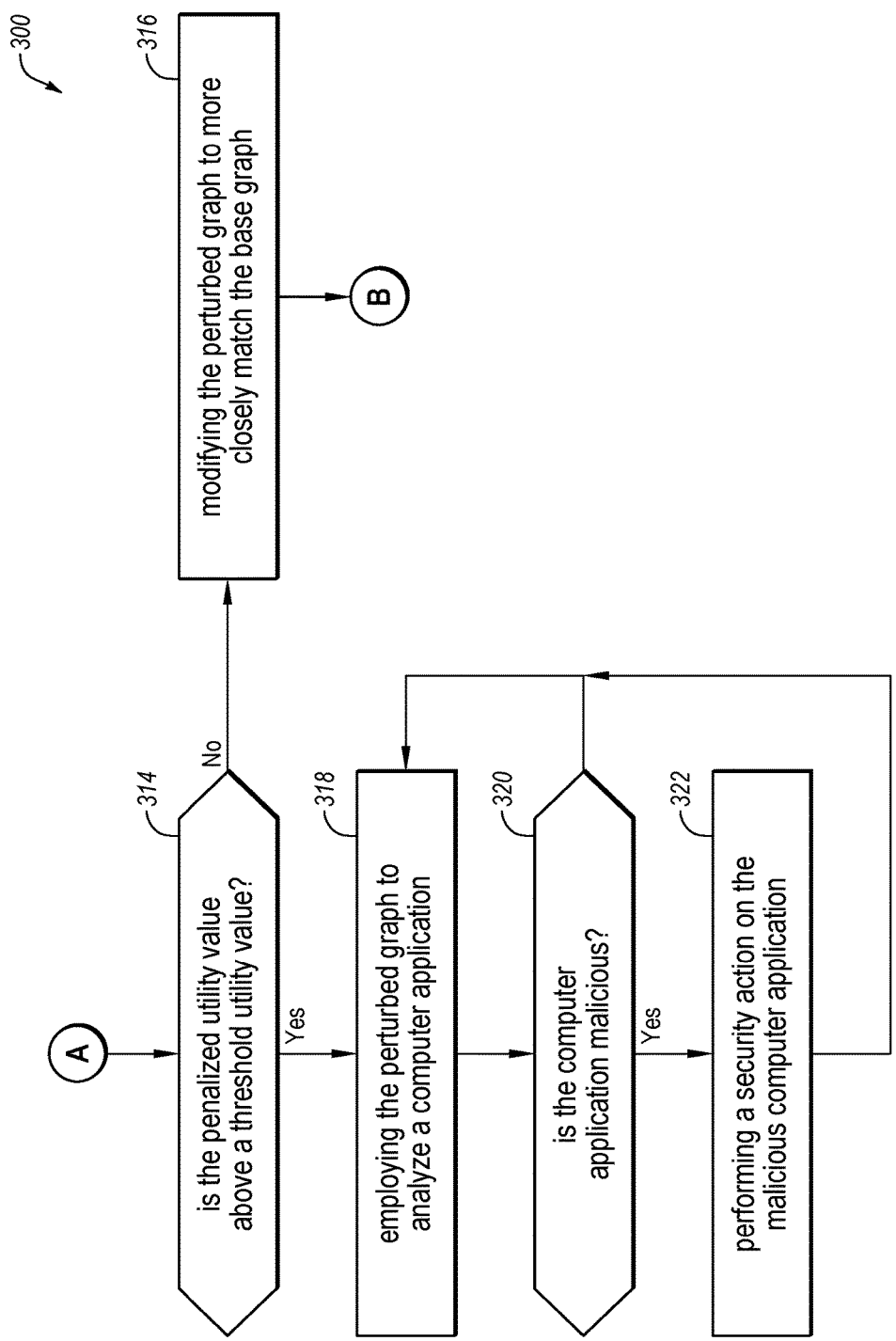

FIGS. 3A-3B are a flowchart of an example method 300 for preventing a malicious computer application from executing in a computing environment. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3A-3B.

The method 300 may include, at block 302, identifying a base graph, and may include, at block 304, identifying a perturbed graph. In some embodiments, the base graph and the perturbed graph may each include edges and vertices. In some embodiments, the base graph may relate to malicious computer applications. In some embodiments, the perturbed graph may represent a summarized version of the base graph. In some embodiments, the perturbed graph may only have edges that match edges in the base graph. In some embodiments, the perturbed graph may have edges that do not match edges in the base graph. For example, the security module 108 may identify, at block 302, the base graph G and the perturbed graph G', which represents a summarized version of the base graph G.

The method 300 may include, at block 306, determining an importance of each of the edges in the base graph with respect to the base graph using an Edge Current-Flow Based Betweenness Centrality (ECFBBC) metric. In some embodiments, the ECFBBC metric may be employed to generate an ECFBBC value for each edge in the base graph. In some embodiments, the ECFBBC metric may treat the base graph as a resistor network in which the edges are treated as resistors and the vertices are treated as junctions between the resistors such that the ECFBBC value of an edge is an amount of current that flows through the edge, averaged over all source-destination vertex pairs, when one unit of current is induced at the source, and the destination is connected to ground. For example, the security module 108 may determine, at block 306, an ECFBBC value for each of the edges E in the base graph G (i.e., ECFBBC values of 0.0738, 0.074, 0.056, 0.072, 0.074, 0.1156, 0.148, 0.1176, 0.17, and 0.099 as disclosed in step 204).

The method 300 may include, at block 308, identifying the edges in the base graph that match the edges in the perturbed graph. In some embodiments, the edges in the base graph that match the edges in the perturbed graph are edges that the base graph and the perturbed graph have in common. For example, the security module 108 may identify, at block 308, the five common edges between the edges E in the base graph G that match the edges E' in the perturbed graph G' (which are bolded in step 206).

The method 300 may include, at block 310, determining an initial utility value for the perturbed graph. In some embodiments, the initial utility value for the perturbed graph may be determined by summing the ECFBBC values of the edges in the base graph that match the edges in the perturbed graph. For example, the security module 108 may determine, at block 310, an initial utility value of 0.4916 or 49.16% for the perturbed graph G' by summing the ECFBBC values of the five common edges identified at block 308 (i.e., 0.074+0.056+0.074+0.1176+0.17=0.4916 or 49.16%). In other words, the security module 108 may determine at step 212 that the initial utility value of the perturbed graph G' is 0.4916 or 49.16% of the value of the base graph G.

The method 300 may include, at block 312, determining a penalized utility value for the perturbed graph by decreasing the initial utility value for each spurious edge in the perturbed graph by a penalty value of the spurious edge. In some embodiments, the penalty value of each spurious edge may be proportional to a weight of the spurious edge. For example, the security module 108 may determine, at block 312, a penalized utility value of 0.3805 or 38.05% for the perturbed graph G' by decreasing the initial utility value (i.e., 0.4916) for each spurious edge in the perturbed graph G' by the penalty value (i.e., $\frac{1}{18}$ or 0.0556) of the spurious edge (i.e. 0.4916−0.0556−0.0556=0.3805 or 38.05%). In other words, the security module 108 may determine at step 212 that the penalized utility value of the perturbed graph G' is 0.3805 or 38.05% of the value of the base graph G.

The method 300 may include, at decision block 314, determining whether the penalized utility value is above the threshold utility value. If not (No at decision block 314), the method 300 may include, at block 316, modifying the perturbed graph to more closely match the base graph and then the method 300 may return to block 306 for the modified perturbed graph. Alternatively, if the penalized utility value is above a threshold utility value (Yes at decision block 314), the method 300 may include, at block 318, employing the perturbed graph to analyze a computer application. For example, the security module 108 may determine, at decision block 314, that the penalized utility value (of 0.3805 or 38.05%) is not above a threshold utility value (e.g., a threshold utility value of 0.40 or 40%), and may therefore modify, at block 316, the perturbed graph G' to more closely match the base graph G, and then return to block 306 for the modified perturbed graph. Alternatively, the security module 108 may determine, at decision block 314, that the penalized utility value (of 0.3805 or 38.05%) is above a threshold utility value (e.g., a threshold utility value of 0.30 or 30%), and may therefore employ, at block 318, the perturbed graph G' to analyze the potentially malicious application 105a on the network device 104a.

The method 300 may include, at decision block 320, determining whether the computer application is malicious. If so (Yes at decision block 320), the method 300 may include, at block 322, performing a security action on the malicious computer application. In some embodiments, the security action may be performed to prevent the malicious computer application from executing in a computing environment. Alternatively, if the computer application is not malicious (No at decision block 320), the method 300 may return to block 318 to analyze another computer application. For example, the security module 108 may determine, at decision block 320, that the potentially malicious application 105a on the network device 104a is a malicious application, due to the malicious application being a virus or malware, and may therefore perform, at block 322, a security action to prevent the malicious computer application from executing on an operating system of the network device 104a. This prevention may include, for example, removing the malicious computer application from the operating system of the network device 104a or quarantining the malicious computer application in the operating system of the network device 104a. Alternatively, the security module 108 may determine, at decision block 320, that the potentially malicious application 105a on the network device 104a is not a malicious application, and may therefore return to block 318 to analyze the potentially malicious application 105b or the potentially malicious application 105n.

The method 300 may thus be employed, in some embodiments, to prevent any of the potentially malicious applications 105a-105n from executing in the operating systems of the network devices 104a-104n by employing a perturbed graph. Some embodiments of the method 300 may accurately determine the utility value of a perturbed graph with respect to its base graph, and then the perturbed graph may be employed in malicious application detection and remediation only where the perturbed graph has a sufficiently high utility value.

Although the blocks of the method 300 are illustrated in FIGS. 3A-3B as discrete blocks, various blocks may be divided into additional blocks, combined into fewer blocks, reordered, expanded, or eliminated, depending on the desired implementation. For example, in some embodiments, blocks 302-310 may be employed without performing blocks 312-322. Also, in some embodiments, blocks 302-310 and at least some of blocks 314-322 may be performed without performing block 312, using the initial utility value instead of a penalized utility value in any of the blocks 314-322 that are performed. Also, in some embodiments, any of blocks 314-322 may be performed by a network administrator or other entity that is different from the entity performing the other blocks of the method 300.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by determining a utility value for a perturbed graph and only employing the perturbed graph in malicious application detection and remediation on one of the network devices 104a-104n when the utility value is above a threshold utility value. The method 300 may thus result in the securing of the network devices 104a-104n from malicious applications using a perturbed graph that both achieves certain privacy and anonymization guarantees and/or a reduction in the overall size of the graph while at the same time guaranteeing that the perturbed graph is sufficiently high in utility to remain reliable in malicious application detection and remediation. The method 300 may be more effective than conventional methods which are not able to accurately determine the utility value of a perturbed graph and/or which do not take into account any penalty for spurious edges in a perturbed graph.

Also, the method 300 may improve the technical field of securing network devices. Accurately determining the utility value of a perturbed graph with respect to its base graph, and then employing the perturbed graph in malicious application detection and remediation only where the perturbed graph has a sufficiently high utility value, is an improvement over conventional methods which are unable to accurately determine the utility value of a perturbed graph and/or do not take into account any penalty for spurious edges in a perturbed graph.

FIG. 4 illustrates an example computer system 400 that may be employed in preventing a malicious computer application from executing in a computing environment. In some embodiments, the computer system 400 may be part of any of the systems or devices described in this disclosure. For example, the computer system 400 may be part of any of the network devices 104a-104n or the security server 106 of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the steps of the method 200 of FIG. 2 and/or one or more blocks of the method 300 of FIGS. 3A-3B.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the steps of the method 200 of FIG. 2 and/or one or more blocks of the method 300 of FIGS. 3A-3B. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more of the steps of the method 200 of FIG. 2 and/or one or more blocks of the method 300 of FIGS. 3A-3B. In some embodiments, the security module 414 may be part of the operating system 410 or may be part of an application of the computer system 400, or may be some combination thereof. In some embodiments, the security module 414 may function as the security module 108 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments.

However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for preventing a malicious computer application from executing in a computing environment, at least a portion of the method being performed by a computing device comprising at least one processor, the method comprising:
    identifying a base graph comprising edges and vertices, the base graph related to malicious computer applications;
    identifying a perturbed graph comprising edges and vertices, the perturbed graph representing a summarized version of the base graph;
    determining an importance of each of the edges in the base graph with respect to the base graph using an Edge Current-Flow Based Betweenness Centrality (ECFBBC) metric to generate an ECFBBC value for the edge;
    identifying the edges in the base graph that match the edges in the perturbed graph;
    determining a utility value for the perturbed graph by summing the ECFBBC values of the edges in the base graph that match the edges in the perturbed graph;
    determining whether the utility value is above a threshold utility value;
    in response to determining that the utility value is above the threshold utility value, employing the perturbed graph to analyze a computer application and determine that the computer application is malicious; and
    performing a security action on the malicious computer application to prevent the malicious computer application from executing in a computing environment.

2. The method of claim 1, wherein the perturbed graph only has edges that match edges in the base graph.

3. The method of claim 1, wherein the perturbed graph has edges that do not match edges in the base graph.

4. The method of claim 1, wherein the ECFBBC metric treats the base graph as a resistor network in which the edges are treated as resistors and the vertices are treated as junctions between the resistors such that the ECFBBC value of an edge is an amount of current that flows through the edge, averaged over all source-destination vertex pairs, when one unit of current is induced at the source, and the destination is connected to ground.

5. The method of claim 1, wherein the malicious computer application is a virus or malware.

6. The method of claim 1, wherein the performing of the security action comprises removing the malicious computer application from the computing environment.

7. The method of claim 1, wherein the performing of the security action comprises quarantining the malicious computer application in the computing environment.

8. A computer-implemented method for preventing a malicious computer application from executing in a computing environment, at least a portion of the method being performed by a computing device comprising at least one processor, the method comprising:
    identifying a base graph comprising edges and vertices, the base graph related to malicious computer applications;
    identifying a perturbed graph comprising edges and vertices, the perturbed graph representing a summarized version of the base graph;
    determining an importance of each of the edges in the base graph with respect to the base graph using an Edge Current-Flow Based Betweenness Centrality (ECFBBC) metric to generate an ECFBBC value for the edge;
    identifying the edges in the base graph that match the edges in the perturbed graph;
    determining an initial utility value for the perturbed graph by summing the ECFBBC values of the edges in the base graph that match the edges in the perturbed graph;
    determining a penalized utility value for the perturbed graph by decreasing the initial utility value for each spurious edge in the perturbed graph by a penalty value of the spurious edge;
    determining whether the penalized utility value is above a threshold utility value;
    in response to determining that the penalized value is above the threshold utility value, employing the perturbed graph to analyze a computer application and determine that the computer application is malicious; and
    performing a security action on the malicious computer application to prevent the malicious computer application from executing in a computing environment.

9. The method of claim 8, wherein the perturbed graph only has vertices that match vertices in the base graph.

10. The method of claim 8, wherein the penalty value of each spurious edge is proportional to a weight of the spurious edge.

11. The method of claim 8, wherein the ECFBBC metric treats the base graph as a resistor network in which the edges are treated as resistors and the vertices are treated as junctions between the resistors such that the ECFBBC value of an edge is an amount of current that flows through the edge, averaged over all source-destination vertex pairs, when one unit of current is induced at the source, and the destination is connected to ground.

12. The method of claim 8, wherein the malicious computer application is a virus or malware.

13. The method of claim 8, wherein the performing of the security action comprises removing the malicious computer application from the computing environment.

14. The method of claim 8, wherein the performing of the security action comprises quarantining the malicious computer application in the computing environment.

15. One or more non-transitory computer-readable media comprising one or more computer-readable instructions that, when executed by one or more processors of one or more computing devices, cause the one or more computing devices to perform a method for preventing a malicious computer application from executing in a computing environment, the method comprising:
    identifying a base graph comprising edges and vertices, the base graph related to malicious computer applications;
    identifying a perturbed graph comprising edges and vertices, the perturbed graph representing a summarized version of the base graph;
    determining an importance of each of the edges in the base graph with respect to the base graph using an Edge Current-Flow Based Betweenness Centrality (ECFBBC) metric to generate an ECFBBC value for the edge;

identifying the edges in the base graph that match the edges in the perturbed graph;

determining a utility value for the perturbed graph by summing the ECFBBC values of the edges in the base graph that match the edges in the perturbed graph;

determining whether the utility value is above a threshold utility value;

in response to determining that the utility value is above the threshold utility value, employing the perturbed graph to analyze a computer application and determine that the computer application is malicious; and performing a security action on the malicious computer application to prevent the malicious computer application from executing in a computing environment.

16. The one or more non-transitory computer-readable media of claim 15, wherein the perturbed graph only has edges that match edges in the base graph.

17. The one or more non-transitory computer-readable media of claim 15, wherein the perturbed graph has edges that do not match edges in the base graph.

18. The one or more non-transitory computer-readable media of claim 15, wherein the ECFBBC metric treats the base graph as a resistor network in which the edges are treated as resistors and the vertices are treated as junctions between the resistors such that the ECFBBC value of an edge is an amount of current that flows through the edge, averaged over all source-destination vertex pairs, when one unit of current is induced at the source, and the destination is connected to ground.

19. The one or more non-transitory computer-readable media of claim 15, wherein the malicious computer application is a virus or malware.

20. The one or more non-transitory computer-readable media of claim 15, wherein the performing of the security action comprises removing the malicious computer application from the computing environment or quarantining the malicious computer application in the computing environment.

* * * * *